United States Patent [19]

Almendres Martinez

[11] Patent Number: 5,348,757
[45] Date of Patent: Sep. 20, 1994

[54] METHOD FOR PREPARING A FATTY AND SEMI-FATTY BLUE FISH FOOD PRODUCT

[75] Inventor: Jose J. Almendres Martinez, Oviedo, Spain

[73] Assignee: Tunimar S.A., Spain

[21] Appl. No.: 55,540

[22] Filed: Apr. 30, 1993

[30] Foreign Application Priority Data

Apr. 30, 1992 [ES] Spain ................... 9200909

[51] Int. Cl.$^5$ ............................................. A23B 4/06
[52] U.S. Cl. ................................ 426/646; 426/643; 426/92; 426/302; 426/100
[58] Field of Search ................ 426/643, 646, 92, 302, 426/100

[56] References Cited

U.S. PATENT DOCUMENTS

| | | | |
|---|---|---|---|
| 3,821,445 | 6/1974 | Okamura | 426/643 |
| 4,172,153 | 10/1979 | Zetherstrom | 426/643 |
| 4,301,182 | 11/1981 | Simon | 426/643 |
| 4,336,274 | 6/1982 | Ross | 426/643 |
| 4,371,560 | 2/1983 | Hochhauser | 426/646 |
| 4,405,649 | 9/1983 | Jeffreys | 426/643 |
| 4,464,404 | 8/1984 | Ueno | 426/643 |
| 4,560,570 | 12/1985 | Rausing | 426/646 |
| 4,622,234 | 11/1986 | Okada | 426/643 |
| 4,888,181 | 12/1989 | Gray | 426/643 |
| 4,971,822 | 11/1990 | Michel | 426/643 |
| 4,992,295 | 2/1991 | Ueno | 426/643 |
| 5,009,918 | 4/1991 | Clairouin | 426/92 |
| 5,223,301 | 6/1993 | Kanda | 426/643 |
| 5,225,232 | 7/1993 | Jyumi | 426/643 |
| 5,229,151 | 7/1993 | Yano | 426/643 |
| 5,254,352 | 10/1993 | Hartman | 426/92 |

*Primary Examiner*—Carolyn Paden
*Attorney, Agent, or Firm*—Ostrolenk, Faber, Gerb & Soffen

[57] ABSTRACT

Procedure to produce a food product including fatty and semi-fatty blue fish is disclosed. The procedure includes the steps of preparing the blue fish by washing, scaling, heading, drawing, skinning and filleting the blue fish. Once the fish is prepared, it is passed through a grinder to produce a uniform mass to which is added a mixture of herbs. The mix of fish and herbs is then homogenized mechanically to form a product mass that is shaped into portions that are covered with fish gelatine. The covered portions then undergo a freezing operation in a liquid nitrogen atmosphere at a temperature between $-18°$ and $-35°$ C. The finished product is later placed in containers.

11 Claims, No Drawings

METHOD FOR PREPARING A FATTY AND SEMI-FATTY BLUE FISH FOOD PRODUCT

BACKGROUND OF THE INVENTION

The present invention relates to a procedure for making a food product based on blue fish.

The intention of this procedure is to obtain a bromatological product that, beginning with a mash of various species of fatty and semi-fatty blue fish and appropriate natural condiments, guaranties that the product will preserve over time the interesting qualifies and natural characteristics of these fish. All this with the aid of an industrial process that incorporates the latest technological discoveries related to conservation by refrigeration, inert atmospheres, vacuum packing, etc..

The advantages of blue fish for a balanced diet are well known. The fats in sea fish are rich in polyunsaturated fatty acids and low in cholesterol. These fish also are important with regard to vitamins since, although they lack vitamin C, they contain modest amounts of the other hydrosoluble vitamins, with the exception of niacine or antipelagic vitamin, and vitamin B12 which they contain in a higher proportion. Fatty fish are also a good source of lyposoluble vitamins A and D.

SUMMARY OF THE INVENTION

The procedure to produce a food product based on fatty and semi-fatty blue fish, consisting of the following stages:

The blue fish is prepared by washing, scaling, heading, drawing, skinning and filleting.

The fish is then prepared by passing it through a grinder to produce a uniform mass to which is added a mixture of herbs.

The mixture is then homogenized by mechanical means to form the product mass that is shaped into portions that are covered with fish gelatin.

Then the coated fish product is frozen in a liquid nitrogen atmosphere at a temperature between $-18°$ and $-35°$ C. and the finished product is later placed in containers.

DESCRIPTION OF THE PREFERRED EMBODIMENTS

The maintenance of the natural qualifies and characteristics of the basic raw material is related to four important objectives that determine the maximum quality to be achieved in the composition of the preparations. These objectives are:

1. Preserve the proportion and quality of fats rich in polyunsaturated acids that contribute to the regulation of cholesterol.

2. Conserve the vitamin complexes and as far as possible add to them using mixtures of natural condiments.

3. Maintain the contribution of proteins and minerals, preserving them in the most perfect state and also adding to them using natural condiments.

4. Achieve organoleptic qualifies (color, texture, aroma and taste) in the end product to make it appetizing to everyone, young and old.

The product is made up of various species of blue fish, the majority belonging to the following families: clupeids, scornbrides, caxangids, engraulids, beloniforms and salmonoids.

Working with this range of species allows a combination, for example, of the periods when each species offers the largest amount of fats, complementing that part of their life cycle least favorable for the quality line desired, with that of another species from a different latitude. At the same time, this allows for commercial flexibility when purchasing the raw material.

From both the nutrition and gastronomic, and also the commercial points of view, the following variables must be taken into account: percentage of fat, protein and vitamin contents, intensity of flavor and smell-aroma, color, percentage of red muscle to be eliminated, texture when fresh and after defreezing, time under refrigeration and frozen and the market price in relation to the desired manufacturing cost. The interrelations between these ten variables will give a constant indication of the importance, appropriateness or need to include a specific species and the groups of these to be considered in view of their qualifies.

The percentage of lipiris is, without doubt, the most important quality factor because:

a) Lipids are responsible for the dietetic excellence of blue fish, due to their good proportion of polyunsaturated fatty acids that help to regulate cholesterol.

b) When they oxidize they produce typical rancid aromas and flavors that are a good indication of the state of the fish since the indicative threshold during a sensofial analysis is very low.

c) Oxidated lipids contribute to the breakdown of proteins, causing changes in their functional and nutritional properties.

d) The formation of oxidated lipid and protein compounds has color changes associated with it.

Thus oxidation of lipids is precisely the time limiting factor for storage and conservation, both for fresh and frozen species, and before and after the production processes.

Lipids influence the quality of the fish in various ways:

Because of its self-oxidation (rancidness) where various external factors influence the external factors include the; presence of catalizers or inhibitors, water activity, technological process applied, etc. and others depending the characteristics of the lipids Themselves, such as the proportion of highly unsaturated fatty acids the, proportion of free fatty acids the placement of the lipids within the tissue the, nature of the compound to which the fatty acid belongs and its position in the same.

Through the influence on the proteins by the polyunsaturated fatty acids during breakdown. Specifically, during conservation by freezing, oxidation of lipids causes alterations in the proteins and blotching effects.

One of the principal objectives of the invention is to impede the oxidation and breakdown of polyunsaturated fatty acids to the greatest possible degree. Their state is also an indicator for use the acceptance of mw material.

According to the characteristics (lipid, protein and vitamin contents, color, smell and flavor) they bring to the blue fish food product in accordance with the invention, three large groups of species can be defined, from which it is possible to choose the most appropriate at a given moment according to life cycle, market availability, etc. These groups include.

First group - Clupeids.

Second group - Large scornbrides

Third group - Carangids, engraulids, beloniforms and small scornbrides, as well as salmonoids.

The additives used in the process of the invention may be any suitable additive.

An additive in accordance with the invention is a substance that contributes to the conservation of the nutritive and organoleptic qualifies of a foodstuff and even improves or complements it.

With regard to the characteristics of the raw material, blue fish, it will be appreciated that additives are needed that have the following properties:

Antioxidation power, to preserve as much as possible and for as long as possible the organoleptic qualifies and characteristics of the lipiris and, in particular, of the polyunsaturated fatty acids.

Conservation and stabilization power coveting the following activities: Bacteriostatic and battericicle. Inhibitors of enzymatic processes caused by proteases, lipases, etc.. Destructive inhibitors of yeasts. Fungitides.

Flavoring power that brings out, complements or tempers the flavors of the raw material.

Aroma imparting power to bring out, complement or temper the aromas of the raw material.

Power to maintain the natural color without the addition of unappropriate color, simply avoiding the symptoms of breakdown of the raw material.

Nutritive power that enriches the raw material in minerals, vitamins, etc..

Unaltered by ultrafreezing, preserving all their qualifies.

Easy to handle during the manufacturing process.

A variety of herbs and natural condiments may be used in the invention, taking into account their specific flavors and aromas, as well as their antioxidation and conservation powers.

Aside from the two essential basic condiments, salt and sugar, herbs are used in the invention mixtures from a wide diversity of families, of which the most important are: labiates, umbellifers, myrtaceae, zingiberals, papilionids, liliales, iridacias, crucifers, piperales, myfistacea, lauraceae and rutacea.

It must be remembered that the activities of these species may be more or less effective depending on the form in which the herb is presented (small pieces, powder, essential oil, macerated, infusion, etc.). For use in the industrial process the forms must be chosen that allow the greatest ease of handling, storage and use, and the greatest speed of application.

In the process of the invention to make a food product based on fatty and semi-fatty blue fish, the following steps are used:

Wash, scale, head, draw, skin and fillet the blue fish.

Once the fish is prepared it passes through a grinder that produces a uniform ground product to which is added a mixture of Herbs. The fish and herbs are then homogenized by mechanical means to form the product mass which then goes to a dosifier that portions out the mix. The mix is then covered with fish gelatine and undergoes a freezing operation in a liquid nitrogen atmosphere at a temperature between −18° and −35° C. and the finished product is then placed in containers.

It should be noted that the blue fish from each of the above mentioned groups form part of each kilo of product with approximately the following weight:

First group: 250–300 g/Kg
Second group: 250–500 g/Kg
Third group: 200–500 g/Kg.

As for the condiments and herbs g they represent from 5 to 65 g/Kg of foodstuff.

Furthermore, between 5 and 10 g/Kg of fish gelatines are used.

Having sufficiently described the nature of the invention and the manner of putting it into practice, it should be noted that the above descriptions may be modified so long as the fundamental principle is not altered.

I claim:

1. A method for producing a fatty and semi-fatty blue fish food product, comprising the steps of:
   a) filleting the blue fish;
   b) grinding the filleted blue fish to produce a uniform mass;
   c) adding an herb to the uniform mass to form a mixture of fish and herb;
   d) homogenizing the mixture of fish and herb to form a product mass;
   e) covering the product mass with fish gelatine; and
   f) freezing the fish gelatine covered product mass.

2. The method according to claim 1, wherein step f) comprises freezing the fish gelatine covered product mass in a liquid nitrogen atmosphere at a temperature between −18° C. and −35° C.

3. The method according to claim 1, further comprising the step of dividing the product mass into a plurality of portions prior to step e).

4. The method according to claim 3, further comprising the steps of placing the portions of product mass covered with fish gelatine into containers.

5. The method according to claim 1, wherein the blue fish is selected from the group consisting of clupeids, scombrides, carangids, engraulids, beloniforms, salmonoids and mixtures thereof.

6. A frozen fatty and semi-fatty blue fish food product, comprising per kilogram of product:
   750–1300 grams of blue fish;
   5–65 grams of a condiment and an herb; and
   5–10 grams of fish gelatine.

7. The frozen food product of claim 6, wherein the blue fish comprises 250–300 grams of clupeids.

8. The frozen food product of claim 6, wherein the blue fish comprises 250–500 grams of scombrides.

9. The frozen food product of claim 6, wherein the blue fish comprises 200–500 grams of blue fish selected from the group consisting of carangids, engraulids, beloniforms, scombrides and salmonoids.

10. The frozen food product of claim 6, wherein the condiment is selected from the group consisting of salt, sugar and mixtures thereof.

11. The frozen food product of claim 6, wherein the herb is selected from the group consisting of the following herb families: labiares, umbellifers, myrtaceae, zingiberals, papilionids, liliales, iridacias, crucifers, piperales, myristacea, lauraceae, rutacea and mixtures thereof.

* * * * *